United States Patent [19]

Malinet et al.

[11] Patent Number: 4,831,871
[45] Date of Patent: May 23, 1989

[54] PROCESS AND APPARATUS FOR CALCULATION OF THE INSTANTANEOUS SPEED OF A TOOL

[76] Inventors: Fréderic Malinet, Villa Tribreiz Chemin de la Gabelle, Golfe Juan, France, 06350; Marc Ibos, Garrevagues, Puylaurens, France, 81700

[21] Appl. No.: 79,364

[22] Filed: Jul. 30, 1987

[51] Int. Cl.$^4$ .............................................. E21B 45/00
[52] U.S. Cl. .................................... 73/151.5; 364/422
[58] Field of Search ..................... 73/151, 151.5, 152; 364/422; 166/66; 324/356, 369

[56] References Cited

U.S. PATENT DOCUMENTS

| | | | |
|---|---|---|---|
| 3,777,560 | 12/1973 | Guidgard | 73/151.5 |
| 4,459,752 | 7/1984 | Babcock | 73/151.5 X |
| 4,607,352 | 8/1986 | Seeman et al. | 364/422 X |
| 4,616,321 | 10/1986 | Chan | 73/151.5 X |
| 4,662,209 | 5/1987 | Brown | 364/402 X |
| 4,697,650 | 10/1987 | Fontenot | 73/151.5 X |

FOREIGN PATENT DOCUMENTS

| | | | |
|---|---|---|---|
| 0783795 | 11/1980 | U.S.S.R. | 364/422 |
| 0830308 | 5/1981 | U.S.S.R. | 364/422 |
| 1099057 | 6/1984 | U.S.S.R. | 73/151.5 |

Primary Examiner—Eugene R. LaRoche
Assistant Examiner—Seung Ham
Attorney, Agent, or Firm—Pollock, Vande Sande & Priddy

[57] ABSTRACT

The process consists of pre-positioning conserving a reversible counter with memory (9) in the maximum state, counting the positive pulses in such state, receiving and counting the positive pulses with respect to a predetermined basic step to derive a number expressed in units of basic step, transmitting this number to at least one priority interrupt terminal (13) of a microprocessor (14); emitting a reference time frequency, measuring the time lapsed between the appearance of two successive pulses presenting themselves at at least the interrupt terminal (13), determining the ratio between the lapsed time and the number expressed in units of basic step, transmitting this ratio to the microprocessor (14) and displaying it, and controlling the advance of an element enabling graphic display of the speed of translation of the rotating or percussive member with respect to its dimension of penetration, this speed of translation of the member being an instantaneous speed of advance.

9 Claims, 2 Drawing Sheets

PROCESS AND APPARATUS FOR CALCULATION OF THE INSTANTANEOUS SPEED OF A TOOL

FIELD OF THE INVENTION

The present invention relates to a process for calculating the instantaneous speed of advance of a rotating or percussive member, particularly a drilling tool. It also relates to apparatus for carrying out such process.

BACKGROUND OF THE INVENTION

In drilling a hole, it is essential to know with precision the position of the rotating or percussive tool as well as the instantaneous speed of advance of drilling for a given section of ground. In fact, such information gives multiple data both on the direction of the drilling operations and on the geology of the ground traversed (lithology, tectonics, mineral associations, approach of a metal or hydrocarbon deposit) by the interpretation of the rheological properties of the formations encountered.

The present invention, in addition to geological surveying and monitoring, permits continuing and precise monitoring of the nature of the ground traversed by the drill hole.

The various prior art devices used to date are generally constituted by a mechanical or optical meter, fast with a pulley driven without slide by a cable connected to the upper end of the boring rods bearing the drilling tool.

Certain of these devices record the time taken to drill a certain unit of length, either as a function of time as in U.S. Pat. No. 2,883,256, or as a function of depth as in U.S. Pat. No. 2,981,102.

In these devices, the speed of advance is determined from incremental measurements which correspond to a length frequency of which the transmission, via a system of the frequency-voltage converter type, furnishes a value of the speed of advance. This process involves smoothing out of the analog output signal, affecting the calculation of the measurement by a detrimental error upon considerable variations in speed due to the pass band imposed by the smoothing.

SUMMARY OF THE INVENTION

The present invention has the object of overcoming the drawbacks of prior art devices, using a process for determining the speed of advance not employing the time function upon display on a continuous graphic recorder, so as to eliminate the defects due to the considerable variations in speed.

Moreover, the structure and synchronization of the different steps of the process according to the invention with respect to one another make it possible, thanks to the management by microprocessor, to contribute a novel method of "on line" acquisition and processing of data.

To that end, the process according to the invention comprises the steps of (a) conserving the counters of a reversible counter with memory in the maximum state;

(b) counting the positive pulses in the state, i.e., adding to the maximum state;

(c) receiving and counting said positive pulses with respect to a predetermined basic step, with a view to creating a number expressed in basic step units;

(d) transmitting this number to at least one priority interrupt terminal of a microprocessor;

(e) emitting a reference time frequency;

(f) measuring the time lapse between the appearance of two successive pulses presenting themselves at at least the interrupt terminal of the microprocessor;

(g) determining the ratio between the lapsed time and the number expressed in basic step units;

(h) transmitting this ratio to the microprocessor and displaying it; and (i) controlling the advance of a means allowing graphic display of the speed of translation of the rotating or percussive member with respect to its dimension of penetration in the medium.

The invention also relates to an apparatus for carrying out this process.

The invention makes it possible to eliminate all the efforts of attenuation on the graphic rendition by the absence of analog smoothing outside the graphic recorder.

It restitutes an average value of instantaneous speed of advance with respect to a value of elementary step or multiple of elementary step, by internal coding of the number of cycles of interruption of the microprocessor.

It also makes it possible to have available digital values of instantaneous speed of advance for the storage of digital data allowing easy subsequent processing.

Finally, it ensures the connection, thanks to a data bus, of any other system which is different, but necessary for the acquisition of other outside parameters in order to have a synchronization at display on a graphic recorder.

BRIEF DESCRIPTION OF THE DRAWINGS

The advantages and characteristics of the invention will be more clearly understood from the following description, given by way of example with reference to the accompanying drawings, in which:

Referring to FIG. 1, the apparatus for carrying out the process according to the invention comprises a certain number of elements described hereinafter:

Figure 1:
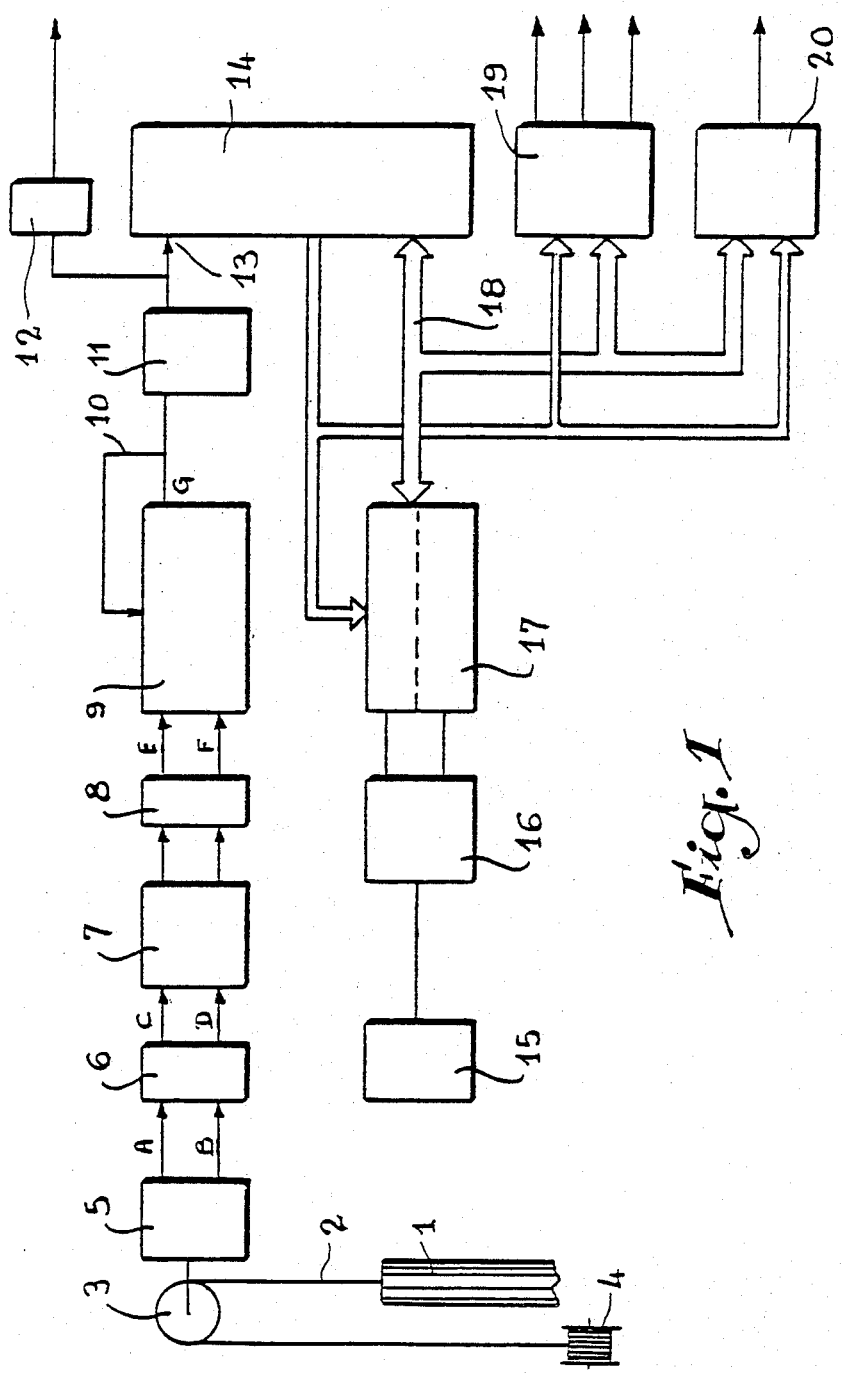
FIG. 1 is a diagram of the different components of the apparatus for carrying out the process according to the invention.

Reference 1 designates a drilling head, i.e., the upper part of a drill pipe string the lower end of which is associated with a rotating or percussive drilling tool (not shown). (It will be understood that the invention applies to any other industrial tool penetrating any medium.) A small inextensible rope 2 is fixed by one of its ends to the head 1, and passes around a pulley 3, its end opposite the one which is associated with the head 1 being wound around a winding drum 4 which maintains constant tension on the rope. In this way, the rotation of the pulley is directly dependent on the translation of the head 1 in either direction.

The translation of the head 1 therefore displaces the rope 2 which brings about rotation of the pulley 3 with which is associated a coder 5 rotating in synchronism with this pulley. This coder is provided to be optical incremental so that, by its design and its movement of rotation, it creates two trains of pulses offset by 90° with respect to each other, either in advance or lagging, depending on the direction of rotation of the pulley 3, and of which the frequency is proportional to the speed of rotation of this pulley.

The coder may thus create two trains of pulses A and B which are applied to a permutation system 6 which may be either electrical or electromagnetic, and which comprises a logic gate of the "EXCLUSIVE OR" type which makes it possible to reposition the two trains of pulses A and B with respect to the downstream circuits. This enables the coder 5 to be located in any position, for example at the top of the derrick of a drill hole or on the revolving table thereof by a device for returning the rope 2, or at any spot facilitating the taking of measurements.

The two outputs of the permutation system 6 are applied to a decoding system 7 which identifies the direction of translation of the head 1. In practice, this system of decoding shows whether the head is descending or rising from the passage of the two trains A and B in a system equivalent to a logic gate of the "EXCLUSIVE OR" type. Such circuits need not be described in greater detail, as they are well known to those skilled in the art.

The two outputs C and D of the decoding system 7 are introduced into a shaping circuit 8 which calibrates the electronic pulses to be introduced downstream in other circuits.

The two outputs E and F of the shaping system 8 of the electronic pulses are applied to the input of a reversible counter device 9, with memory whose functions differ depending on whether it receives pulses E or F, i.e., on whether the pulse trains have been identified as coming from the descent of the head 1 (channel E) or from its rise (channel F).

The device 9 comprises counters which, initially, are positioned in their maximum state.

If the pulse train comes from channel E, the latter passes through the device 9 without modification of the counters as it emerges from this device by a loop 10 intended to maintain the counters in their maximum state despite the passage of the pulses coming from channel E. In this way, a permanent cycle is obtained upon every appearance of pulse.

If the pulse train comes from channel F corresponding to the rise of head 1, the train will trigger a progressive decrementation of the counters of the device 9, such decrementation being effected by as many units as there are pulses in the train in question coming from channel F. If, after having risen, the head 1 redescends, the pulse train emitted in register and coming from channel E will trigger a progressive incrementation of the counters of the device 9 which are as indicated hereinabove in a state inferior to the maximum state. As soon as the counters return to their maximum state, the surplus pulses are transferred by the output channel G of device 9 so that, as indicated hereinafter, the position of the tool associated with the head 1 may be located in terms of length.

By this procedure, the device 9 materializes the functions described hereinabove.

The highest output of the transfer of the counters of this device 9, consequently represents on output G the elementary step of length of drilling. This value is not necessarily a whole value of units of length; it may be a decimal value.

This value is then adjusted by means of a divider 11, in order to represent the desired basic step. This step is chosen so as to represent a length, for example 5 mm, with the result that the divider 11 emits pulses representative of a value expressed in basic step units. In other words, the divider divides the number of pulses received by a number of pulses equal to that of the basic step in order to obtain a quotient representative of the value of advance of the head 1 or of a drilled length.

It is then possible to display the advance of the tool associated with the head 1 or of that of any other located point connecting the head 1 to this tool on a depth counter 12. The counter 12 may, for example, display the equivalent in centimeters of advance of the tool.

The pulse thus calibrated issuing from the divider 11 is taken to at least one interrupt terminal 13 inside a microprocessor 14, said terminal having to have priority over the rest of the tasks of this microprocessor in order to be able to carry out the calculations relative to the instantaneous speed of advance of the head 1 or of the tool which is connected thereto.

Figure 2:
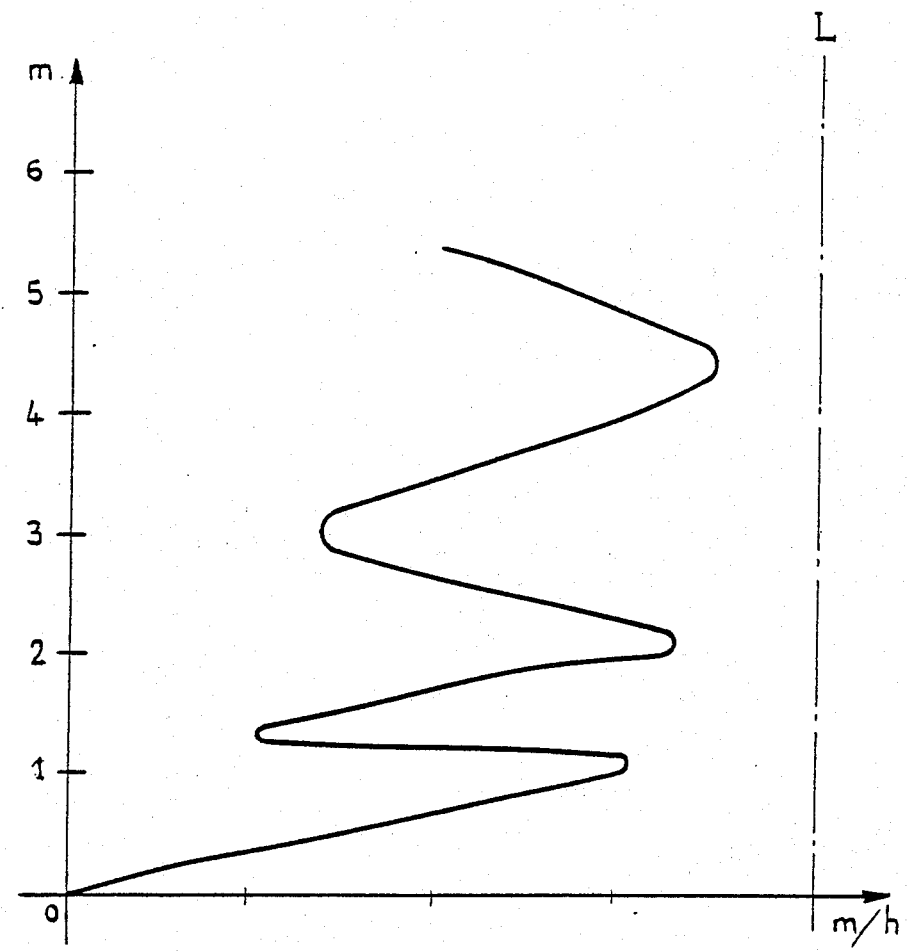
FIG. 2 is the graphic representation of the variation of instantaneous speed of advance of the tool with respect to the dimension of depth.

A precision clock 15 outside the assembly of the elements described hereinabove delivers a reference frequency representing either the maximum value of translation that may be attained by the head 1, or the maximum speed desired for the graphic restitution of the instantaneous speed of advance, or any other representation of speed of a physical phenomenon, either via a divider 16 or by the direct action of the reference frequency by the clock 15. This time frequency is applied by a frequency divider 17, pre-positioned to a certain value which is the digital image of the full scale of a graphic recorder. In other words, the divider is pre-positioned at a value representing the maximum abscissa of the graphic representation of the phenomenon as illustrated in FIG. 2.

The principal role of this frequency divider 17 is therefore to permanently count down between two interruptions triggered off by the arrival on at least the interrupt terminal 13 of a calibrated pulse representative of an elementary step of length of advance of the head 1. In other words, the frequency divider measures the time lapsed between the appearance of two successive pulses at the terminal 13 of the microprocessor 14 and representative of a length of advance and determines the ratio between said lapsed time and the basic step (5 mm in the example chosen). This gives a number which is the reciprocal of the value of the instantaneous speed of advance. The calculation is carried out by the microprocessor 14, and its result is taken by a data bus 18 to a circuit 19 of digital/analog conversion type with single or multiple output and with lock, thus allowing continuous display on a graphic recorder of the instantaneous speed of advance without smoothing affecting the measurement.

Moreover, each pulse arriving at the interrupt terminal 13 of the microprocessor 14 triggers the function of unwinding of the display support of the graphic recorder made in the form of a web of paper, which thus unwinds due to the action of a step-by-step motor 20, with the result that the ordinates of the graph obtained illustrate the depth of advance at the scale of depth chosen. The flexibility of this device makes it possible, either by modifying the frequency of the clock 15 or by using an intermediate divider 16 and/or by acting on the value of the numbers of pre-positioning of the frequency divider 17, to obtain several calibrations of instantaneous speed of advance and to be able to display them on several channels of the graphic recorder, thus enabling all the ranges of speed necessary for the optimum exploitation of this determining parameter to be covered.

In addition, it makes it possible to effect with maximum reliability the execution and perfect synchronization of the restitution of the instantaneous speed of advance solely from the measurement of speed of rotation of the pulley 3.

As illustrated in FIG. 2, the instantaneous speed of advance in meters per hour has been plotted on the x-axis and within the limit of the maximum displacement of the tool connected to the head 1 represented by the vertical line L, while the depth in meters has been plotted on the y-axis. For example, the graph indicates that the instantaneous speed of advance has decreased between 2 and 3 meters of depth, from which it may be deduced that, in this zone, a rock has been encountered of which the drillability has diminished, and which may easily be identified.

The interrupt terminal 13 may be replaced by an "AND" gate (not shown).

We claim:

1. Process for determining and calculating the instantaneous speed of advance of a rotating or percussive member (1), particularly a drilling tool, of the type in which pulses are firstly elaborated from the translation of the device, then counted, decoded and calibrated, comprising the steps of
    (a) pre-positioning a reversible counter with memory (9) in its maximum state;
    (b) emitting successive pulses as said tool advances;
    (c) passing said pulses through said counter with a view to its passage from its maximum state to a zero state, thereby creating a plotting pulse returning through a loop (10) of said counter for positioning said counter in the maximum state;
    (d) receiving and counting said positive pulses (G) to determine a value of a length of advance of said tool;
    (e) dividing said value by a predetermined reference number to arrive at a quotient representing said value of advance;
    (f) transmitting said reference number to at least one priority interrupt terminal (13) of a microprocessor (14);
    (g) emitting a reference time frequency;
    (h) measuring the time elapsed between the appearance of two successive pulses presenting themselves at at least an interrupt terminal (13);
    (i) determining the ratio between the elapsed time and the number expressed in basic step units;
    (j) transmitting said ratio to the microprocessor (14) and displaying it; and
    (k) controlling the advance of a means allowing graphic display of the speed of translation of said member with respect to its dimension of penetration, said speed of translation of said member being an instantaneous speed of advance.

2. Process according to claim 1, including counting the negative pulses of the maximum state in the reversible counter with memory (9) when the member (1) moves in a direction opposite a direction of advance of said member; and returning said reversible counter to its maximum state in order that, after a pull-back of the member with memory (9) (1), said reversible counter counts the positive pulses again during advance of the rotating or percussive member.

3. Process according to claim 1, wherein the interrupt terminal (13) of the microprocessor (14) is located at the output of an "AND" gate.

4. Device for determining and calculating the instantaneous speed of advance of a rotating or percussive member, comprising means for carrying out the process according to any one of claims 1 to 3.

5. Device according to claim 4, comprising
    (a) an inextensible rope (2) one end of which is associated with a support head (1) of said member and passes around a pulley (3) driven in rotation by linear displacement of said rope (2);
    (b) a coder (5) driven by rotation of said pulley and emitting pulses;
    (c) a permutation system (6) receiving said pulses and generating outputs (C, D) applied to a decoder (7) from which the pulses are calibrated in a shaping circuit (8);
    (d) means for applying the calibrated pulses to a reversible counter with memory (9) while allowing the positive pulses to traverse it without modification;
    (e) a divider receiving said positive pulses and dividing the number of pulses received by a fixed number corresponding to a step of translation predetermined with respect to the basic step, with a view to furnishing a value of the translation of the member expressed in units of basic step; and
    (f) a system (10) in said reversible counter with memory (9) for looping said pulses in order to maintain said counter in its maximum state.

6. Device according to claim 5, wherein the negative pulses corresponding to a rise of said member (1) decrement by as much the counters of the reversible counter with memory (9), the positive pulses generated by a succeeding stroke of advance of said member (1) recrementing said counters up to their maximum state.

7. Device according to claim 6, comprising means for entering the value of the translation expressed in basic step units into a processing microprocessor (14).

8. Device according to claim 7, further comprising a component (15) for producing a time frequency the signals of which are transmitted to a frequency divider (17) which measures the time elapsed between the appearance of two successive pulses at said interrupt terminal (13) of said microprocessor (14).

9. Device according to claim 6, comprising means for establishing the ratio between the lapsed time and the number expressed in basic step units in said microprocessor (14) and then transmitting it to a digital/analog conversion circuit (19) representing the value of an instantaneous speed of advance displayable on a graphic recorder and to the same display device of which the y-axis corresponds to the chosen scale of depth and which comprises a drum of which the step-by-step rotation motor (20) receives unwinding pulses of which the frequency is proportional to the chosen scale of depth.

* * * * *